(12) United States Patent
Fincher

(10) Patent No.: US 9,358,849 B2
(45) Date of Patent: Jun. 7, 2016

(54) TOWING ASSEMBLY WITH AUTOMATIC LOCK

(71) Applicant: Defense Products and Services Group Holding Company, Fredericksburg, VA (US)

(72) Inventor: Charles Kennith Fincher, Fredericksburg, VA (US)

(73) Assignee: Defense Products and Services Group Holding Company, Fredericksburg, VA (US)

( * ) Notice: Subject to any disclaimer, the term of this patent is extended or adjusted under 35 U.S.C. 154(b) by 0 days.

(21) Appl. No.: 14/666,722

(22) Filed: Mar. 24, 2015

(65) Prior Publication Data

US 2015/0191062 A1 Jul. 9, 2015

Related U.S. Application Data

(63) Continuation-in-part of application No. 13/684,714, filed on Nov. 26, 2012, now Pat. No. 8,985,612, which is a continuation of application No. 13/076,520, filed on Mar. 31, 2011, now Pat. No. 8,353,522.

(51) Int. Cl.
| | |
|---|---|
| *B60D 1/40* | (2006.01) |
| *B60D 1/44* | (2006.01) |
| *B60D 1/167* | (2006.01) |
| *B60D 1/04* | (2006.01) |
| *B60D 1/54* | (2006.01) |

(52) U.S. Cl.
CPC .. *B60D 1/44* (2013.01); *B60D 1/04* (2013.01); *B60D 1/1675* (2013.01); *B60D 1/54* (2013.01)

(58) Field of Classification Search
CPC .................................. B60D 1/44; B60D 1/40
See application file for complete search history.

(56) References Cited

U.S. PATENT DOCUMENTS

| | | | | | |
|---|---|---|---|---|---|
| 2,386,195 | A | * | 10/1945 | Clark ........................ | B60D 1/40 280/477 |
| 3,612,576 | A | * | 10/1971 | Marler ..................... | B60D 1/40 280/475 |
| 3,860,267 | A | * | 1/1975 | Lyons ...................... | B60D 1/40 280/479.3 |
| 5,232,240 | A | * | 8/1993 | Johnson ................... | B60D 1/54 280/491.4 |
| 5,342,076 | A | * | 8/1994 | Swindall .................. | B60D 1/40 280/479.2 |
| 6,644,680 | B1 | * | 11/2003 | Coe .......................... | B60D 1/36 280/477 |
| 7,293,791 | B1 | * | 11/2007 | Williams, Jr. ............ | B60D 1/00 280/478.1 |
| 8,356,831 | B2 | * | 1/2013 | Pollock .................... | B60D 1/02 280/479.3 |
| 2006/0163841 | A1 | * | 7/2006 | Krstovic .................. | B60D 1/40 280/478.1 |

* cited by examiner

*Primary Examiner* — Tony Winner
(74) *Attorney, Agent, or Firm* — Laurence P. Colton; Smith Tempel Blaha LLC

(57) ABSTRACT

A towing bar assembly that may convert from an articulated assembly extracting a vehicle in an inaccessible location to a rigid assembly for safely towing a vehicle on a road and having an automatic locking mechanism for locking the towing assembly in the articulated position.

19 Claims, 22 Drawing Sheets

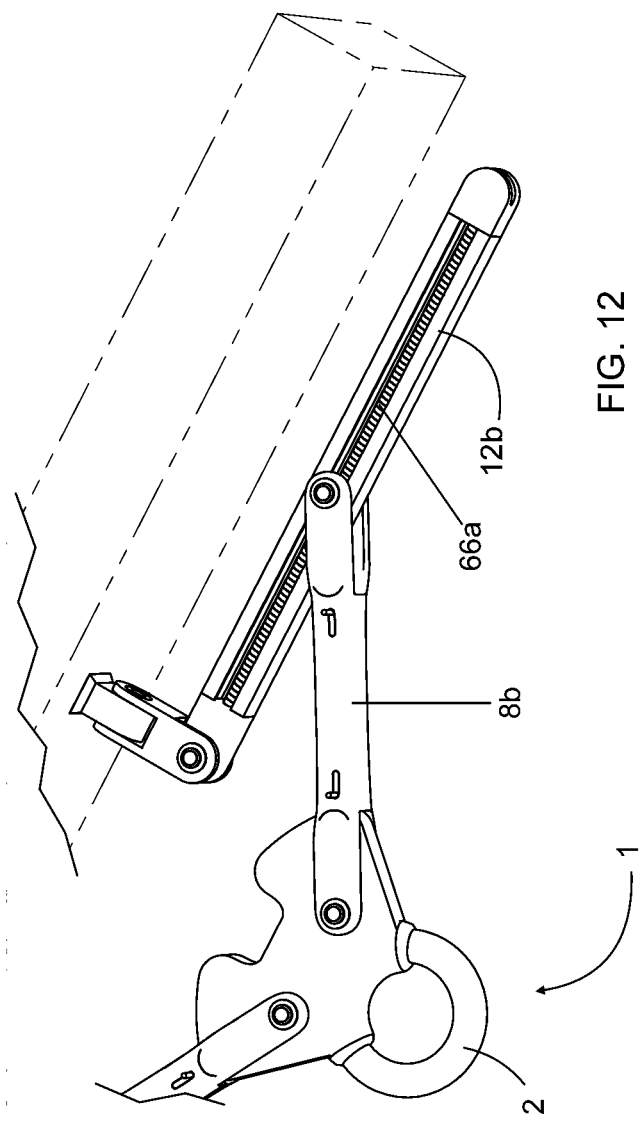

TOWING ASSEMBLY WITH AUTOMATIC LOCK

STATEMENT OF RELATED APPLICATIONS

This patent application is a continuation-in-part of pending U.S. patent application Ser. No. 13/684,714 having a filing date of 26 Nov. 2012, which is a continuation of U.S. patent application Ser. No. 13/076,520 having a filing date of 31 Mar. 2011, which issued as U.S. Pat. No. 8,353,522 on 15 Jan. 2013.

BACKGROUND OF THE INVENTION

1. Field of the Invention

The present invention generally relates to an assembly for towing. More specifically, the present invention relates to a towing bar assembly for towing vehicles. In particular, the present invention relates to a towing bar assembly that may convert from an articulating assembly for more easily extracting a vehicle from an inaccessible location to a rigid assembly for more safely towing a vehicle on a road, an automatic locking mechanism for locking the towing bar assembly in a closed or storage or unarticulated position and/or in an open or operating or articulated position, and a mechanism for articulating the towing bar assembly. By having an assembly that may convert from one that articulates to one that is rigid, and that may be automatically locked in the desired position, and that may be automatically operated, safer storage, use, and towing can be achieved with heretofore unrealized results.

2. Description of the Related Art

Assemblies for towing vehicles require many, often competing functions. As in many designs, in order to maximize the functionality of one operation there is often a concomitant reduction in the functionality of another operation. For example, in order to extract vehicles from an inaccessible location, such as a ditch, it is preferable to have a supple and flexible assembly to reach the ditched vehicle. Such assemblies are often woven fabric, multi-strand cable, or other substantially tensile structures. However, after extraction, when towing the vehicle on a road, it is preferable to have a rigid assembly to more securely affix the towed vehicle to the towing vehicle. Such assemblies are often of rigid triangular shape. However, such rigid assemblies, although safer for towing on the road, are of far less use in the extraction process. There is therefore a great need in the art for a towing assembly that can both reach difficult locations and still safely tow the extracted vehicle.

Additionally, currently known towing assemblies either do not lock in place or require manual locking in place. As a result, such towing assemblies either freely move between a first position and a second position or must be locked in a desired position by manual manipulation by a user or operator, both of which may not be highly desirable under certain usage situations. An automated locking mechanism therefore can be beneficial.

Further, currently known towing assemblies must be manually manipulated from the closed or storage or unarticulated position to the open or operating or articulated position, and back. As a result, such towing assemblies must be manually manipulated between a first position and a second position, also which may not be highly desirable under certain usage situations. An automated operating mechanism therefore can be beneficial.

Accordingly, there is now provided with this invention an improved towing assembly effectively overcoming the aforementioned difficulties and longstanding problems inherent in towing vehicles and in using and operating towing assemblies. These problems have been solved in a simple, convenient, and highly effective way by which to construct a towing assembly comprising an automated lock and/or an automated operating mechanism.

BRIEF SUMMARY OF THE INVENTION

According to one aspect of the invention, the towing assembly comprises a hitch and a pair of members pivotally attached to the hitch. Each member has a first shaft, a second shaft, and a locking joint therebetween.

According to another aspect of the invention, the towing bar comprises a lunette, a first shaft attached at one end to the lunette, a second shaft attached at one end to the lunette, a first elbow joint attached to the first shaft at another end, a second elbow joint attached to the second shaft at another end, a third shaft attached at one end to the first elbow joint, and a fourth shaft attached at one end to the second elbow joint.

According to yet another aspect of the invention, the articulating towing assembly comprises a hitch and a pair of members attached to the hitch. Each pair of members has two shafts and a locking joint between each of the two shafts of each of the pair of members. The pair of members locked for rigidly securing the orientation thereof with respect to the hitch.

As will be appreciated by those persons skilled in the art, a major advantage of the present invention is providing a towing assembly that can both reach difficult locations and still safely tow the extracted vehicle, that in certain embodiments comprises an automated locking mechanism, and that in certain other embodiments comprises an automated operating mechanism.

According to one aspect of an automated locking mechanism embodiment of the invention, when the towing assembly is articulated from the closed or storage position to the open or operating position, certain components of the towing assembly are then automatically locked in place preventing the towing assembly from moving or collapsing back to the closed or storage position.

According to one aspect of an automated operating mechanism embodiment of the invention, the towing assembly is articulated from the closed or storage position to the open or operating position using an automated system with which certain components of the towing assembly are automatically moved or acted upon, whereby the towing assembly is articulated from the closed or storage position to the open or operating position, from the open or operating position to the closed or storage position, or both.

Additional objects of the present invention will become apparent from the following description. The method and apparatus of the present invention will be better understood by reference to the following detailed discussion of preferred embodiments and the attached figures which illustrate and exemplify such embodiments.

BRIEF DESCRIPTION OF THE DRAWINGS

Specific embodiments of the present invention will be described with reference to the following drawings, wherein:

FIG. 12 is a perspective view of a third embodiment of the towing assembly magnified on the right slotted joint.

DETAILED DESCRIPTION OF PREFERRED EMBODIMENTS

Figure 1:
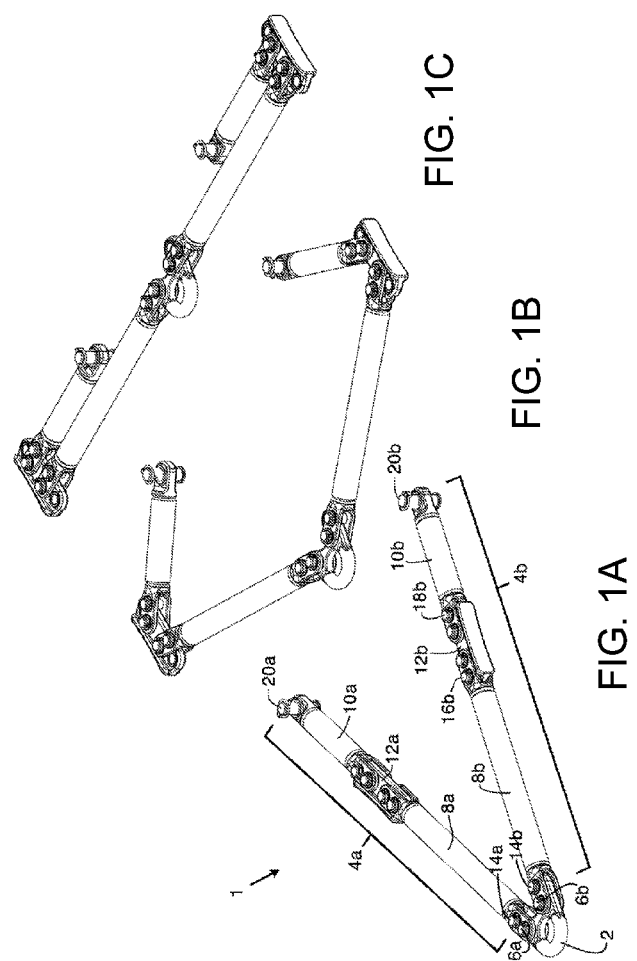
FIG. 1A is a perspective view of a first embodiment of the towing assembly in its extended position.
FIG. 1B is a perspective view of a first embodiment of the towing assembly in a partially folded position.
FIG. 1C is a perspective view of a first embodiment of the towing assembly in its fully folded position.

The following preferred embodiments as exemplified by the drawings are illustrative of the invention and are not intended to limit the invention as encompassed by the claims of this application.

The assembly for towing 1, as illustrated generally in FIGS. 1-4, is for extracting an immobilized vehicle and then towing it. The towing assembly 1 is preferably made of steel, of either solid or hollow elements. The towing assembly comprises a hitch 2, often referred in the industry as a lunette. The hitch 2 is typically of a toroidal shape for engagement with a pintle hook (not shown) attached to a towing vehicle. The hitch may be of a variety of types for such engagement, as is well known to those skilled in the art. Attached to the hitch 2 are two members 4a and 4b. Members 4a and 4b are each pivotally attached to the hitch 2 by a pin 6a and 6b, respectively. In one embodiment, the pin pivotally attaching the members to the hitch is a threaded bolt having a nut to secure it. In other embodiments, the pin may be a cotter pin or a bolt threaded into the hitch itself. In still other embodiments, a spring loaded detent mechanism may be used. Multiple types of attachments may be used to pivotally attach the members to the hitch, as is well known to those skilled in the art.

The two members 4a and 4b are preferably symmetrical with each other and accordingly member 4a has two shafts 8a and 10a with a joint 12a therebetween and member 4b has two shafts 8b and 10b with a joint 12b therebetween. It is the shafts 8a and 8b of members 4a and 4b, respectively that are pivotally attached to the hitch 2. The orientation of the attachment of the members to the hitch may be fixed in place by a locking mechanism 14a and 14b, respectively. In one embodiment, the locking mechanism fixing the orientation of the members to the hitch is a threaded bolt having a nut to secure it. In other embodiments, the locking mechanism may be a cotter pin or a bolt threaded into the hitch itself. In still other embodiments, a spring loaded detent mechanism may be used. In still other embodiments, the locking mechanism and the joint upon which it acts may be configured for a specialized automatic/automated locking mechanism. In still other embodiments, an automated mechanism can interact with the members 4a and 4b, and more specifically with the shafts 8a and 10a and 8b and 10b (see FIGS. 9A-9D, 12, and 13), for operating the towing assembly. Multiple types of locking mechanisms, automated locking mechanisms, and automated operating mechanisms may be used to lock the orientation of the members to the hitch and to manipulate components of the towing assembly 1, as is well known to those skilled in the art.

Each of the two shafts 8a, 10a, 8b, 10b of each of the members 4a, 4b are attached to one another by the joint 12a and 12b. Typically referred to as an elbow joint by those skilled in the art, the joints 12a and 12b may also be used to lock the orientation of each of the respective shafts 8a and 10a, 8b and 10b in an aligned position. In one embodiment, the locking joints 12a and 12b fixing the orientation of the shafts 8a, 10a, 8b, 10b to each other each have pins 16a and 18a, and 16b and 18b. In other embodiments, the pins 16a, 16b, 18a, 18b may be threaded bolts each having a nut to secure it. In yet other embodiments, the locking mechanism may be a cotter pin or a bolt threaded into the joint itself. In still other embodiments, a spring loaded detent mechanism may be used. Multiple types of locking mechanisms may be used to lock the orientation of the shafts 8a, 10a, 8b, 10b with each other, as is well known to those skilled in the art.

The aligned position, specifically shown in FIG. 1A, allows the towing assembly 1 to form a substantially equilateral triangle when the towing assembly 1 is in its extended position. Typically, this aligned position may be achieved when tensile force is substantially equally applied to each pair of shafts 8a, 10a, 8b, 10b of each pair of members 4a, 4b.

When each of the pins 14a and 14b, 16a and 16b, and 18a and 18b, are disengaged from their respective joints, the towing assembly 1 may articulate from its extended aligned position through an intermediate position illustrated in FIG. 1B, to a folded position illustrated in FIG. 1C. When the towing assembly 1 is in the fully folded position illustrated in FIG. 1C, each shaft 8a, 10a, 8b, 10b of each member 4a, 4b is substantially parallel to each other.

Attached to the end of shafts 10a and 10b are attaching mechanisms 20a and 20b for attachment to a vehicle to be towed. Many types of such mechanisms may be used, for example, shackles, eye bolts, or universal joints as shown in FIG. 2, as is well known to those skilled in the art.

Figure 2:
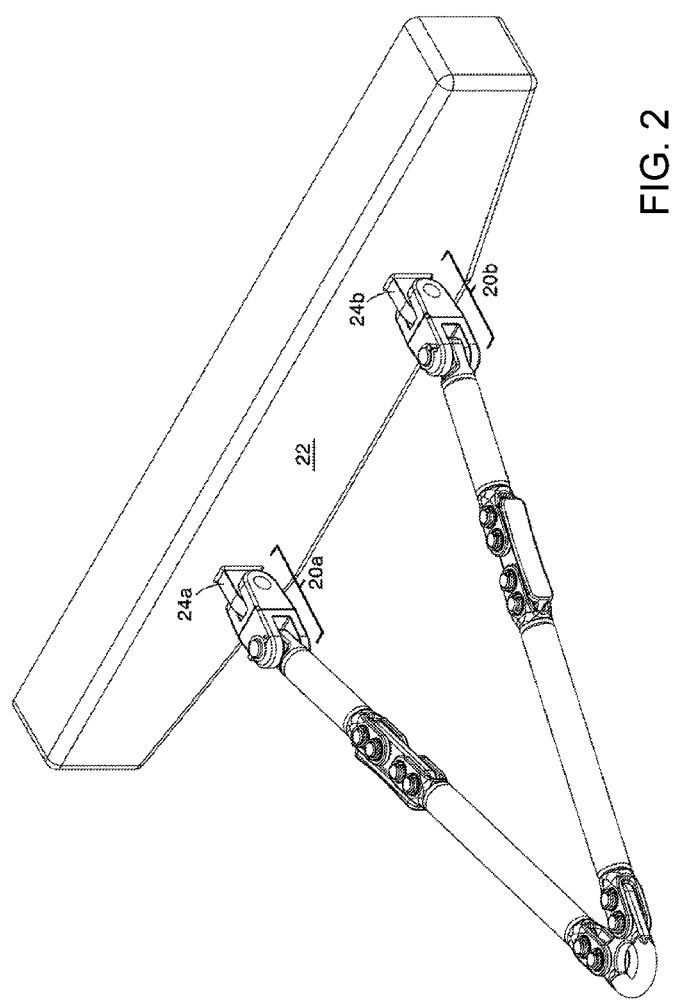
FIG. 2 is a perspective view of a first embodiment of the towing assembly in its extended position attached to a bumper.

FIG. 2 depicts the towing assembly 1 attached to a bumper 22 of a vehicle to be towed. As shown, the bumper 22 has two attaching devices 24a and 24b for mating with the attaching mechanisms 20a and 20b, respectively. Until the locking pins 14a and 14b, 16a and 16b, and 18a and 18b are in engagement with their respective joints 12a, 12b, the towing assembly 1 may articulate for ease of attachment to an otherwise inaccessible vehicle.

Figure 3:
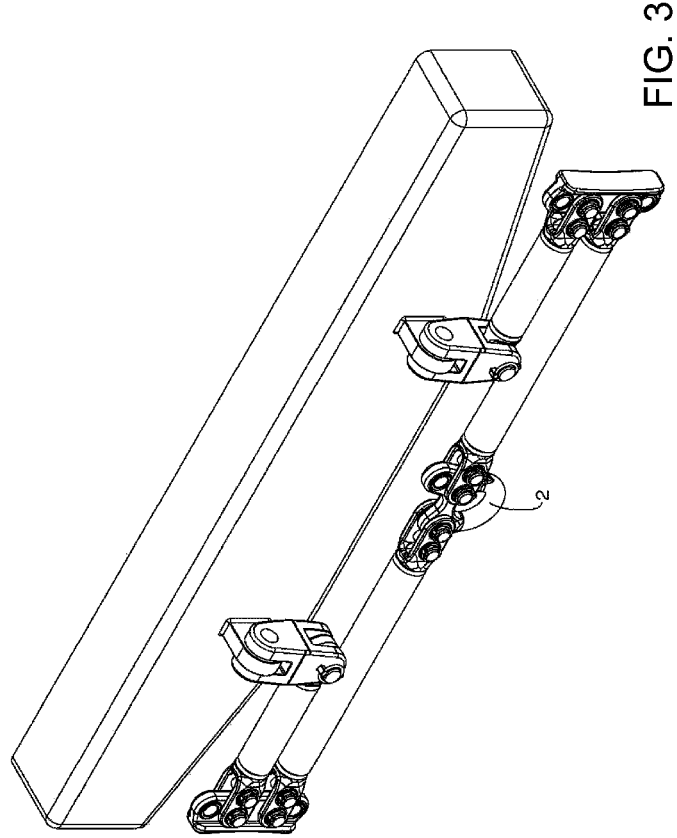
FIG. 3 is a perspective view of a first embodiment of the towing assembly in its fully folded position attached to a bumper.

FIG. 3 also depicts the towing assembly 1 attached to a bumper 22 of a vehicle, although in its substantially folded position. In this embodiment, the bumper 22 of the vehicle to which the towing assembly 1 is attached is the towing vehicle. Accordingly, when not in use, it is preferable to have it in its folded position. In this embodiment, it is the hitch 2 that is used to attach to the vehicle to be towed.

Figure 4:
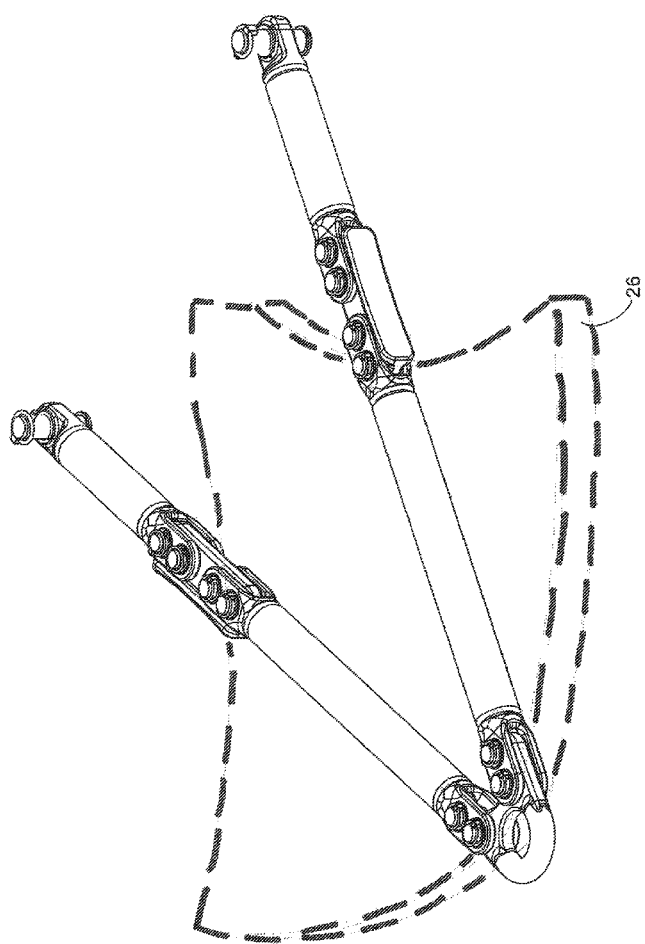
FIG. 4 is a perspective view of a first embodiment of the towing assembly illustrating its range of motion.

In FIG. 4, the space defined by dotted line 26 illustrates the range of motion of the towing assembly 1. Thus, although made of rigid components, the towing assembly 1 can articulate through a wide range of motion. This allows attachment to a vehicle when it is in a difficult position for access. When, for example, the ditched vehicle has been extracted from its immobilized position, the towing assembly 1 can be moved from its articulated position (FIG. 1B) to its fully extended position (FIG. 1A). Having moved into its fully extended, substantially equilateral triangular configuration (FIG. 1A), all of the shafts 8a, 10a, 8b, 10b can be locked into their respective locking joints 12a, 12b so that the towed vehicle can be more safely towed along a thoroughfare.

Figure 5:
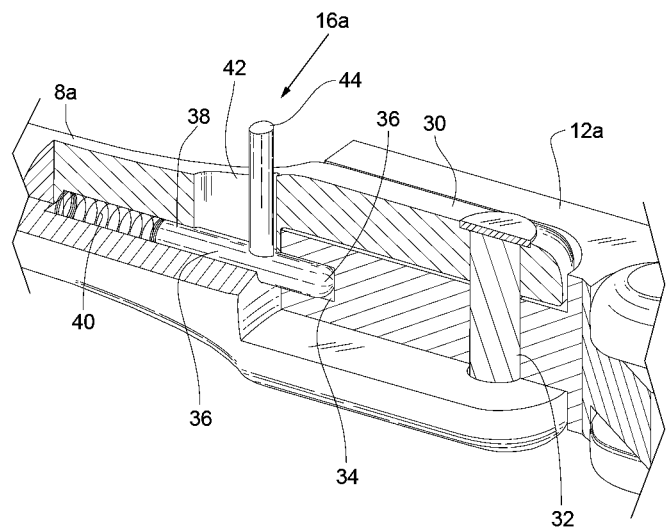
FIG. 5 is a magnified cut-away view of the towing assembly of FIG. 1A exposing the interior of the shaft as it is detachably and pivotally coupled to the elbow joint.
Figure 8:
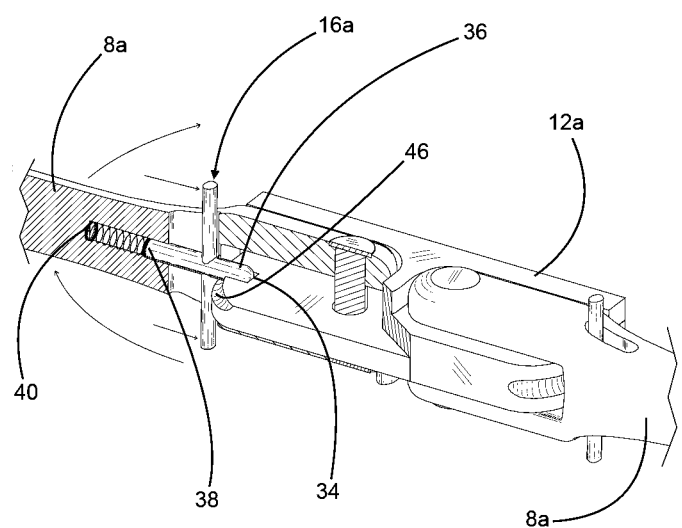
FIG. 8 is a magnified cut-away view of the towing assembly of FIG. 1A exposing the interior of the shaft as the shaft is detachably and pivotally coupled to the elbow joint and in a third position.

FIG. 5 depicts a second embodiment of the locking mechanism 16a, 16b, 18a, 18b, and a second embodiment of the elbow joint 12a, 12b of assembly for towing 1. These embodiments of the locking mechanism 16a, 16b, 18a, 18b and the elbow joint 12a, 12b are configured for automatic locking (i.e., engagement with the elbow joint 12a, 12b) whenever the corresponding and associated shafts of the member 4a, 4b are aligned and parallel relative one another (as is best seen in FIG. 1A and FIG. 8). This results in the corresponding and associated shafts of the member 4a, 4b being held fixed in their relative parallel alignment unless the locking mechanism 16a, 16b, 18a, 18b is directly and/or remotely disengaged (described in greater detail herein).

More specifically, FIG. 5 depicts a magnified cut-away view of the interior of shaft 8a of member 4a with a clevis termination 30 as it is detachably and pivotally coupled to the elbow joint 12a by a pin 32. In one embodiment, the pin 32 is a threaded bolt having a nut/cap to secure it (as is depicted in FIG. 5). In other embodiments, the pin 32 may be a cotter pin or a bolt threaded into the joint itself. In still other embodiments, a spring loaded detent mechanism may be involved with the pin 32. In still other embodiments, the pin 32 may be a clevis pin having a clevis tang. Multiple types of the pin 32 may be used to detachably and pivotally couple the shaft 8a to the elbow joint 12a, as is well known to those skilled in the art.

The embodiment of the locking mechanism 16a shown in FIG. 5 is engaged with the elbow joint 12a via a socket 34. The socket 34 is configured to receive and securely hold at least a portion of the locking mechanism 16a such that, when the locking mechanism 16a is engaged, the shaft 8a is held fixed in its alignment relative to the elbow joint 12a. Although FIG. 5 depicts the socket 34 as a single relatively shallow cavity defined by the elbow joint 12a, one of ordinary skill in the art understands that the socket 34 may involve more complex geometric/mechanical configurations.

The locking mechanism 16a of FIG. 5 engages with the socket 34 of the elbow joint 12a via a bolt 36 that automatically, and retractably, extends out of the clevis termination 34 of the shaft 8a. More specifically, the automatic extension and retractable extension functions of bolt 36 are facilitated by a barrel 38, which holds and guides the bolt 36 as it extends or retracts, and a spring mechanism 40, which forces the bolt 36 to its fully extended position when the bolt 36 aligns with the socket 34. More specifically, the spring mechanism 40 is compressed during retraction of the bolt 36 into the barrel 38, and the spring mechanism 40 is uncompressed during the extension of the bolt 34 into the socket 34. Although FIG. 5 depicts the bolt 36 as a single cylindrical extension with a rounded tip, one of ordinary skill in the art understands that the bolt 36 may involve more complex geometric/mechanical configurations (described in greater detail herein). If this is the case, then the socket 34 complements the bolt 36 such that the socket 34 remains mechanically operable.

At the junction between the clevis termination 30 and the shaft 8a is an aperture 42. The barrel 38 accesses the aperture 42 such that the bolt 36 extends across the aperture 42, preferably relative to the length of the aperture 42, for reception into the socket 34. A handle 44 is attached to the bolt 36, and the handle 44 projects perpendicularly from the bolt 34 through the aperture 42, such that at least a portion of the handle 44 extends out of the aperture 42 and is accessible from outside of the joint 12a, whereby a user can manipulate the handle 44 and thus the bolt 34. The aperture 42 defines a sufficient space to allow the handle 44 to be moved backwards towards the shaft 8a such that the bolt 36 may be disengaged from the socket 34, and forced deeper into the barrel 38, thus compressing the spring mechanism 40. As disengaging the bolt 36 from the socket 34 requires retraction of the bolt 36 into the barrel 38, the locking mechanism 16a is configured to automatically reengage with the socket 34, such as, for example, via the decompressing spring mechanism 40, whenever the shaft 8a is appropriately aligned with the elbow joint 12a and the handle 44 is not receiving a disengaging force. In other words, the spring mechanism 40 forces the bolt 36 into the socket 34 when the bolt 36 aligns with the socket 34.

Although FIG. 5 depicts the aperture 42 as generally oval in shape, and proximate to the junction between the clevis termination 30 and the shaft 8a, one of ordinary skill in the art understands that aperture 42 and/or the handle 44 may involve more complex geometric/mechanical configurations. Moreover, the aperture 42 may be positioned on the shaft 8a, accordingly, based on the specific configuration/complexity of the locking mechanism 16a being employed.

Figure 6:
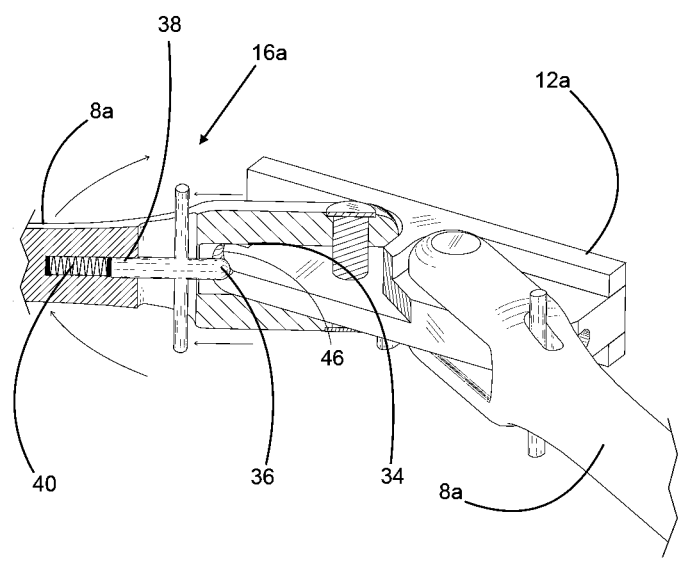
FIG. 6 is a magnified cut-away view of the towing assembly of FIG. 1A exposing the interior of the shaft as the shaft is detachably and pivotally coupled to the elbow joint and in a first position.

As shown in FIG. 6, a guide groove 46 can define an elongated recess along the surface of the elbow joint 12a at the junction between the locking mechanism 16a and the elbow joint 12a. More specifically, the guide groove 46 can define an elongated rounded/concave recess complementary of the rounded tip of the bolt 36. The guide groove 46 tapers towards the socket 34 such that a bolt 36 pushing against the guide groove 46 during articulation is guided into and would eventually access the socket 34, allowing the spring mechanism 40 to decompress, and fully extend towards a maximum length, so as to force bolt 36 into socket 34.

Therefore, when the locking mechanism 16a is disengaged from the socket 34, and the shaft 8a is articulating upon the elbow joint 12a, the guide groove 46 is configured to channel the bolt 36 towards and away from the socket 34. Furthermore, the guide groove 46 is configured to minimize the resistance to articulation (e.g., friction) of the shaft 8a upon the elbow joint 12a. Additionally, the guide groove 46 is configured to facilitate the automatic locking function of the locking mechanism 16a when the shaft 8a is appropriately aligned with the elbow joint 12a, whereby the action of the decompressing spring mechanism 40 on the bolt 36 can assist in aligning the shaft 8a with the elbow joint 12a such that the bolt 36 can access the socket 34 (as is described in greater detail herein).

Although FIG. 6 depicts the guide groove 46 as an elongated rounded/concave recess complementary of the rounded tip of the bolt 36, one of ordinary skill in the art understands that the guide groove 46 may involve more complex geometric/mechanical configurations compatible with any other complex components of the towing assembly 1, e.g., multiple bolts 36, elaborate and complex automatic/automated locking mechanisms 16a, differently shaped elbow joints 12a, differently terminated shafts 8a.

Figure 7:
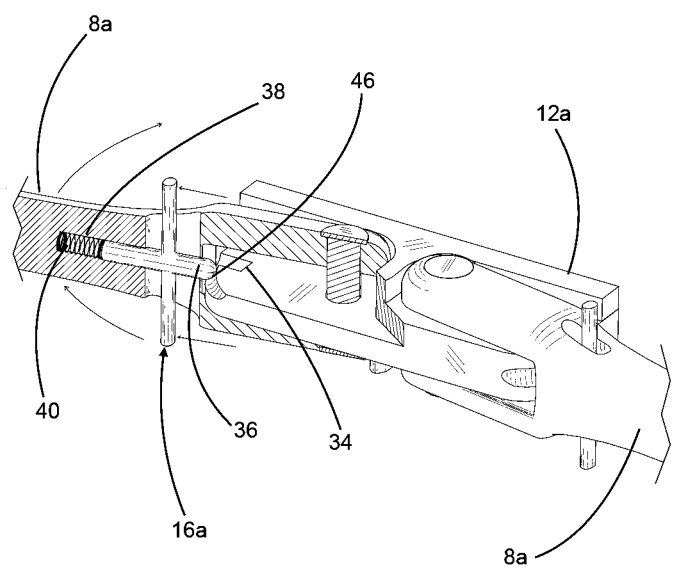
FIG. 7 is a magnified cut-away view of the towing assembly of FIG. 1A exposing the interior of the shaft as the shaft is detachably and pivotally coupled to the elbow joint and in a second position.

FIGS. 6-8 depict an embodiment of the articulation range available to the towing assembly 1 of FIG. 1A. More specifically, the shaft 8A detachably and pivotally coupled to the elbow joint 12a is shown transitioning from the disengaged position of FIG. 6 through the disengaged position of FIG. 7 to the engaged position of FIG. 8. Moreover, FIGS. 6-8 present cut-away views of the junction between the shaft 8a and the elbow joint 12a as the locking mechanism 16a transitions through the positions.

In the position of FIG. 6 (a first position), the locking mechanism 16a is disengaged from the socket 38. The shaft 8a is articulating upon the elbow joint 12a in a clockwise direction. The bolt 36 is being channeled by the guide groove 46 towards the socket 34. Because the guide groove 46 tapers towards the socket 34, the bolt 36 is pushing against the guide groove 46 as it begins to round the edge towards the socket 34. The bolt 36 is being maintained within the barrel 38, which compresses the spring mechanism 40.

In the position of FIG. 7 (a second position), the locking mechanism 16a is still disengaged from the socket 38; however, the shaft 8a is near appropriate alignment with the elbow joint 12a for the locking mechanism 16a to automatically engage with the socket 34. The shaft 8a is still articulating upon the elbow joint 12a in a clockwise direction. The bolt 36 is still being channeled by the guide groove 46 towards the socket 34. The bolt 36 still is pushing against the guide groove 46 as it begins to round towards the socket 34. The bolt 36 is still being maintained within the barrel 38, which compresses the spring mechanism 40.

In the position of FIG. 8 (a third position), the locking mechanism 16a is engaged with the socket 34 because the shaft 8a is appropriately aligned with socket 34 in the elbow joint 12a. The appropriate alignment has allowed the compressed spring mechanism 40 to decompress, which fully extended the bolt 36 to its maximum position out of the barrel 38 and into the socket 34. Therefore, the locking mechanism 16a has automatically engaged with the socket 34.

The user can manipulate the handle 44 to disengage the bolt 36 from the socket 34 when releasing the locked towing assembly 1. For example, when the towing assembly 1 is in the articulated and locked position, with the shafts 8a and 10a, 8b and 10b aligned and bolt 36 extending into socket 34, spring mechanism maintains the bolt 36 within the socket 34. To unlock the towing assembly 1, the user can pull on the handle 44 in the direction that withdraws the bolt 36 from the socket 34, thus moving the bolt 36 out of the socket 36 and further into the barrel 83, thus compressing the spring mechanism 40. This disengages the bolt 36 form the socket 34 and unlocks the shafts 8a, 8b, 10a, 10b from the elbow joint 12a, 12b, thereby allowing the towing assembly to de-articulate.

A locking mechanism comprising socket 34, bolt 36, barrel 38, spring mechanism 40, aperture 42, handle 44, and guide groove 46 can be incorporated in each part of the towing assembly 1, such as between each of shafts 8 and elbow joints 12, and between each of shafts 10 and elbow joints 12, whereby each of the shafts 8, 10 can be automatically locked to the elbow joints 12. Additionally, locking mechanisms also can be incorporated between each of shafts 8 and hitch 2 whereby each of shafts 8 can be automatically locked to the hitch 2, and between each of shafts 10 and attaching mechanism 22 or attaching devices 24 each of shafts 10 can be automatically locked to the and attaching mechanism 22 or attaching devices 24.

FIGS. 9A-9D illustrate another embodiment of the towing assembly 1 that is configured for automated operation. In this embodiment, the towing assembly 1 is capable of automatically moving from the fully extended position of FIG. 9A through the first intermediate position of FIG. 9B and the second intermediate position of FIG. 9C to the fully folded position of FIG. 9D (described in greater detail herein), and back.

First, the towing assembly 1 comprises a toroidal lunette 2. Attached to the lunette 2 are two embodiments of members 4a and 4b. The toroidal lunette and the members can be differently structured and configured than the embodiments of FIGS. 1-8. The members 4a and 4b are each detachably and pivotally coupled to the lunette 2 via attachment extensions 3a and 3b, respectively. Members 4a and 4b pivot, at least in part, upon the attachment extensions 3a and 3b of the lunette 2 via clevis pins 3a and 3b, respectively.

The attachment extensions 6a and/or 6b, and the corresponding shaft 8a and/or 8b, are configured for similar automatic locking as that described for FIGS. 5-8. More specifically, the attachment extensions 6a and/or 6b may have similar structural features and configurations to the elbow joint 12a of FIGS. 5-8, and the shaft 8a and/or 8b may have similar structural features and configurations to the shaft 8a of FIGS. 5-8. However, the attachment extension 6a, 6b of FIGS. 9A-9D can define one or more sockets 34, such as an outer socket, a middle socket, and an inner socket (not individually depicted in the figures) aligned such that the shaft 8a, 8b may be held fixed in three different alignments relative to the slotted joint 12a, 12b (described in greater detail herein). Various other types of attachment structures and configurations known to one having ordinary skill in the art may be used to pivotally attach the members to the lunette at different alignments.

In this embodiment, member 4a has one shaft 8a detachably and pivotably coupled to a slotted joint 12a, and member 4b has one shaft 8b detachably and pivotally coupled to a slotted joint 12b. The orientation of the attachment of the shafts 8a and 8b and the lunette 2 are fixed in place by automated locking mechanisms 14a and 14b, respectively. Similarly, the orientation of the attachment of the shafts 8a and 8*b* and the slotted joints 12*a* and 12*b* are fixed in place by automated locking mechanisms 16*a* and 16*b*, respectively (best seen in FIGS. 10A-11D).

The slotted joints 12*a* and 12*b* can be configured for a different type of articulation than that described for the elbow joint 12*a* of FIGS. 1-8. For example, the slotted joints 12*a* is structured, on one end, like a human forearm. The open elongated slot 60*a* defined by the slotted joint 12*a* is configured to receive the clevis pin 32*a* as it traverses the clevis termination 30*a* of the shaft 8*a* such that the clevis pin 6*a* may run back and forth in the open slot 6.

In one embodiment, the slotted joint 12*a* comprises a carrier 62*a* (best seen in FIGS. 11B-11D) configured to facilitate the reception and movement of the clevis pin 32*a* of the shaft 8*a* within/along the slot 60*a* of the slotted joint 12*a*. The carrier 62*a* may define an aperture through which the clevis pin 32*a* traverses. Furthermore, the carrier 62*a* may move along a track/path (not depicted) within the confines of the slot 60*a*. This facilitates the retention of the carrier 62*a* within the slot 60*a*. One having ordinary skill in the art understands that the carrier 62*a* may take various shapes and structures and is not limited by what is depicted in FIGS. 11B-11D.

In another embodiment, the slotted joint 12*a* comprises hydraulic and/or electric automation subcomponent(s) (e.g., hydraulics, pneumatics, electromotives, Bowden cable mechanisms, mechanical motors/gears/rotating screws/pulleys) that are controllable by a remote user. For example, in the particular embodiment of FIGS. 9A-9D, the slotted joint 12*a* comprises an automated telescoping rod system 64*a*. The rod system is configured to extend and push the clevis pin 32*a* of the shaft 8*a* away from the bumper attaching mechanism 20*a*, and retract and pull the clevis pin 32*a* towards the bumper attaching mechanism 20*a*.

Figure 13:
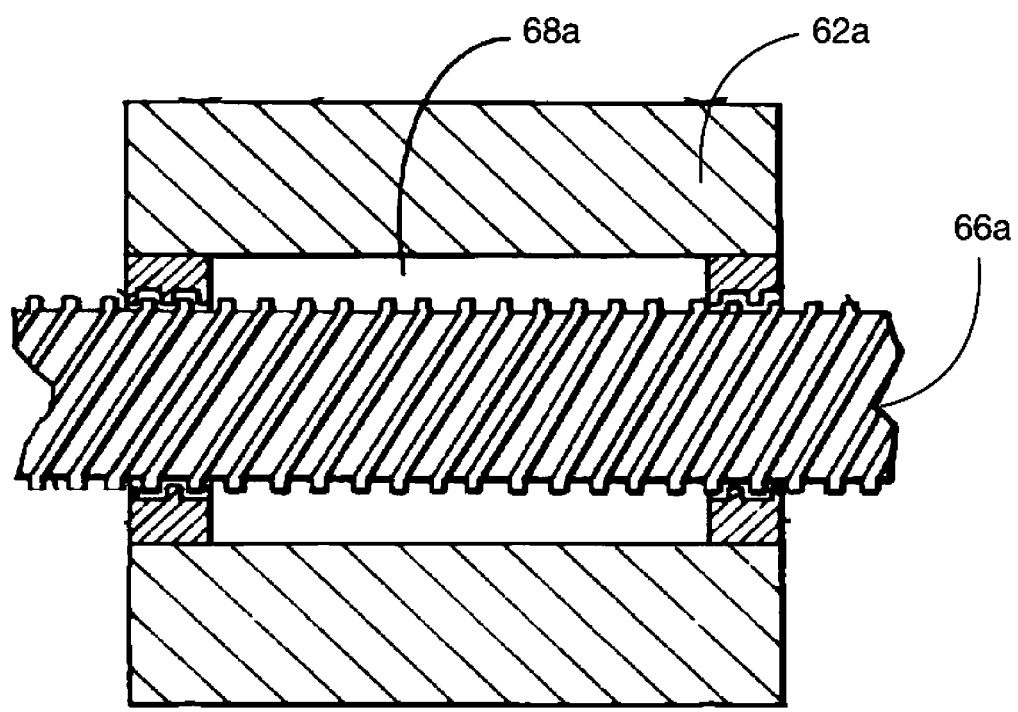
FIG. 13 is a sectional view of the carrier of the right slotted joint of FIG. 12 engaged with an automated rotating screw.

In another example, best seen in FIGS. 12-13, the slotted joint 12*a* comprises an automated rotating screw 66*a* extending along the length of the slot 60*a*. The carrier 62*a* and the clevis pin 32*a* (not depicted in FIG. 13) are configured to detachably couple to the automated rotating screw 66*a* such that a rotation of the screw pushes or retracts the carrier 62*a*, and any attached clevis pins, within/along the slot 60*a*. More specifically, the carrier 62*a* is hollow and defines a threaded aperture 68*a* through which the automated rotating screw 66*a* traverses.

Figure 9A:
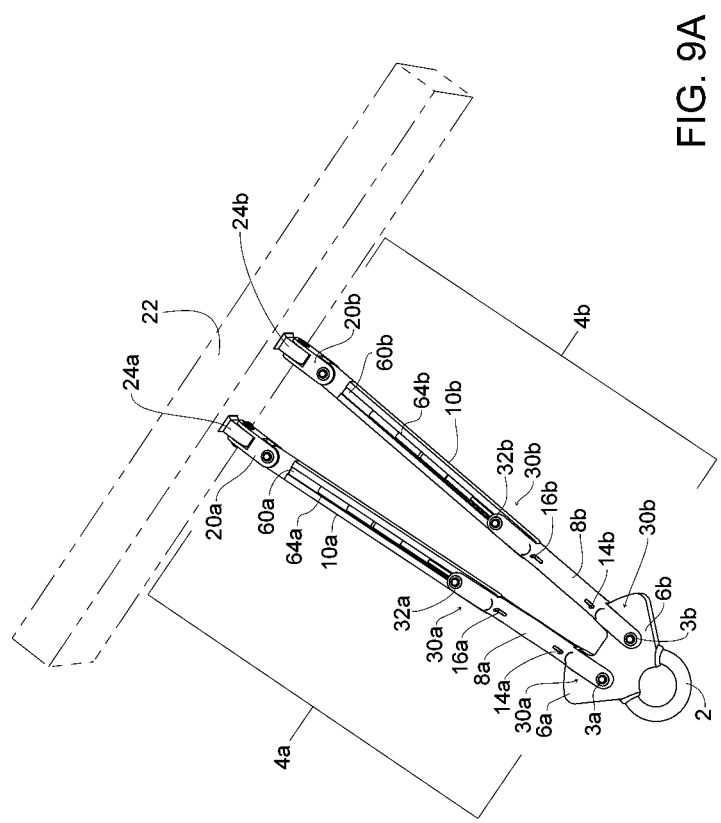
FIG. 9A is a perspective view of a second embodiment of the towing assembly in its extended position.
Figure 9B:
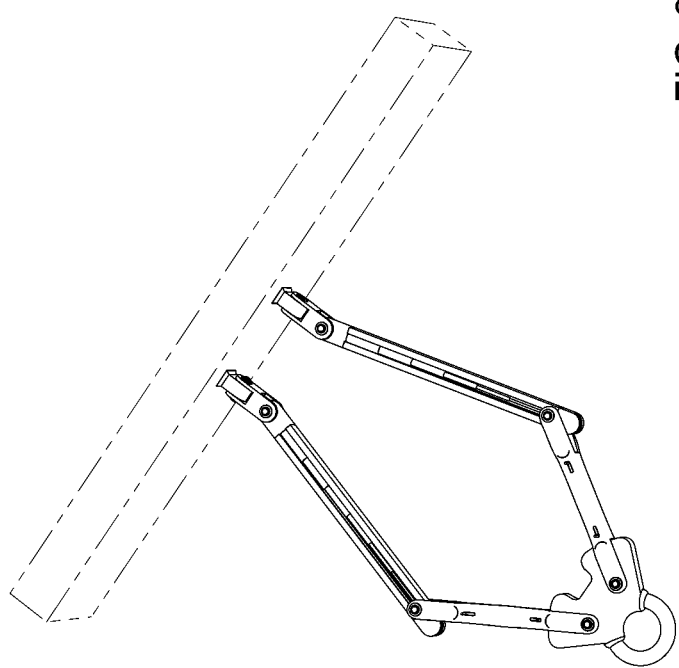
FIG. 9B is a perspective view of a second embodiment of the towing assembly in its first intermediate position.
Figure 9C:
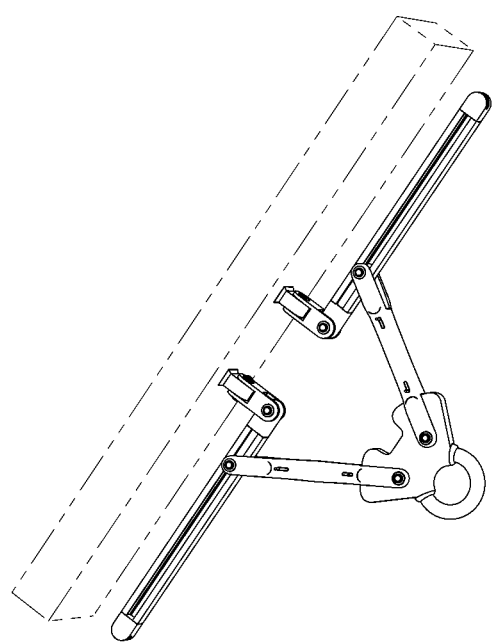
FIG. 9C is a perspective view of a second embodiment of the towing assembly in its second intermediate position.
Figure 9D:
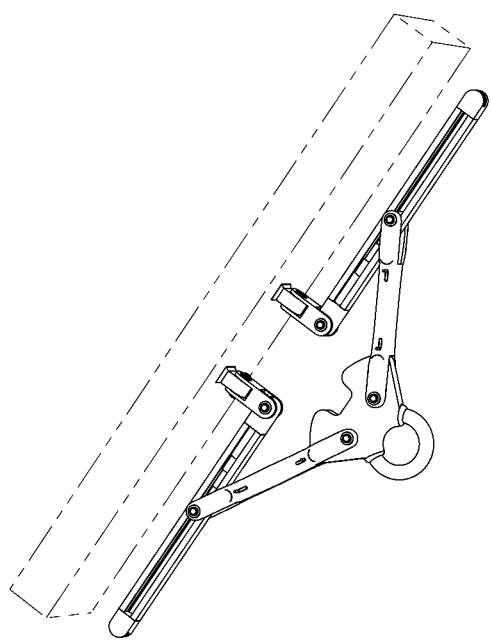
FIG. 9D is a perspective view of a second embodiment of the towing assembly in its folded position.

FIGS. 9A-9D depict the towing assembly 1 as collapsing from the fully extended position of FIG. 9A through the first intermediate position of FIG. 9B and the second intermediate position of FIG. 9C to the fully folded position of FIG. 9D. In certain embodiments, the automation is capable of expanding the towing assembly 1 as well.

In the fully extended position of FIG. 9A, the automated locking mechanisms 14*a* and 14*b* of the shafts 8*a* and 8*b* are in a first alignment position, i.e., the shafts 8*a* and 8*b* are aligned with the inner socket of the extensions 6*a* and 6*b* of the lunette 2. The automated locking mechanisms 14*a* and 14*b* are disengaged from the inner sockets. The locking mechanisms 16*a* and 16*b* are also disengaged from the socket of the slotted joints 12*a* and 12*b*. The automated telescoping rod systems 64*a* and 64*b* of the shafts 8*a* and 8*b* are extended and capable of retracting. A simultaneous retraction of the rod systems 64*a* and 64*b* would cause the alignment of the shafts 8*a* and 8*b*, relative to the lunette 2, to shift from the first alignment position to the second alignment position (depicted in FIG. 9B). One having ordinary skill in the art understands that this shift happens because the shafts 8*a* and 8*b* swing outwards as the clevis pins 32*a* and 32*b* retract within/along the slots 60*a* and 60*b* of the slotted joints 12*a* and 12*b*.

In the first intermediate position of FIG. 9B, the automated locking mechanisms 14*a*, 14*b* of the shafts 8*a*, 8*b* are in the second alignment position, i.e., the shafts 8*a*, 8*b* can be aligned with the middle socket of the lunette 2. The automated locking mechanisms 14*a*, 14*b* can be engaged with the middle socket. The locking mechanisms 16*a*, 16*b* remain disengaged from the socket of the slotted joints 12*a*, 12*b*. The automated telescoping rod systems 64*a*, 64*b* of the shafts 8*a*, 8*b* are capable of continuing to retract. A simultaneous retraction of the rod systems 64*a*, 64*b* would cause the clevis pins 32*a*, 32*b* and, therefore, the lunette 2, to be pulled towards the bumper attaching mechanisms 20*a*, 20*b*.

This collapsing of the towing assembly 1 occurs because the alignment of the shafts 8*a*, 8*b* (relative to the lunette 2) are fixed, which prevents the shafts 8*a*, 8*b* from swinging outwards relative to the lunette 2. This forces the slotted joints 12*a*, 12*b* to swing outwards, instead, as the clevis pins 32*a*, 32*b* retract within/along the slotted joints 12*a*, 12*b*. Moreover, this collapsing stops once the slotted joints 12*a*, 12*b* have swung fully outwards (i.e., nearly parallel with the bumper 22), and the clevis pins 32*a*, 32*b* have fully retracted within/along the slots 60*a*, 60*b*.

In the second intermediate position of FIG. 9C, the automated locking mechanisms 14*a*, 14*b* can remain in the second alignment position. The locking mechanisms 16*a*, 16*b* remain disengaged from the sockets of the slotted joints 12*a*, 12*b*. The collapsing has stopped because the slotted joints 12*a*, 12*b* have swung fully outwards (nearly parallel with the bumper 22), and because the clevis pins 32*a*, 32*b* have fully retracted within/along the slots 60*a*, 60*b*.

In the second intermediate position of FIG. 9C, the automated locking mechanisms 14*a*, 14*b* are also disengaged from the inner socket of the lunette 2. The automated telescoping rod systems 64*a*, 64*b* of the shafts 8*a*, 8*b* are retracted and capable of extending. A simultaneous extension of the shafts 8*a*, 8*b* would cause the alignment of the shafts 8*a*, 8*b*, relative to the lunette 2, to shift from the second alignment position to the third alignment position (depicted in FIG. 9D). This would also cause the lunette 2 to displace slightly further towards the bumper 22, which ultimately places the towing assembly 1 in the fully folded position (best depicted in FIG. 9D).

The shift of the shafts 8*a*, 8*b*, and the further retraction of the lunette 2, occur because the clevis pins 32*a*, 32*b* are pushed away from the bumper attaching mechanisms 20*a*, 20*b* within/along the slotted joints 12*a*, 12*b*. This causes the shafts 8*a*, 8*b* to swing outwards; eventually, positioning the automated locking mechanisms 14*a* and 14*b* in the third alignment position wherein, for example, the shafts 8*a*, 8*b* are aligned with the outer socket of the extensions 6*a*, 6*b* of the lunette 2.

In the fully fold position of FIG. 9D, the automated locking mechanisms 14*a*, 14*b* of the shafts 8*a*, 8*b* are in the third alignment position. The automated locking mechanisms 14*a*, 14*b* of the shafts 8*a*, 8*b* are engaged with the outer sockets of the lunette 2. The locking mechanisms 16*a*, 16*b* are also disengaged from the sockets of the slotted joints 12*a*, 12*b*. The automated telescoping rod systems 64*a*, 64*b* of the shafts 8*a*, 8*b* are extended and capable of retracting or extending. The slotted joints 12*a*, 12*b* are swung fully outwards and nearly parallel with the bumper 22.

Figure 10A:
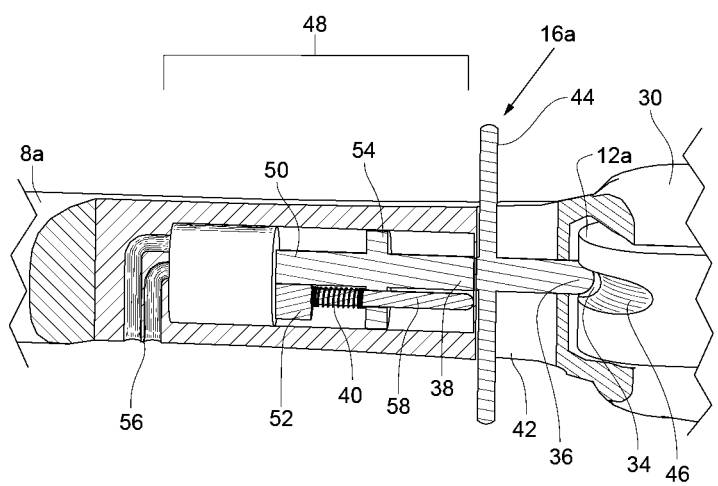
FIG. 10A is a magnified sectional view of the towing assembly of FIG. 9A exposing the interior of the shaft as the shaft is detachably and pivotally coupled to the slotted joint.
Figure 10B:
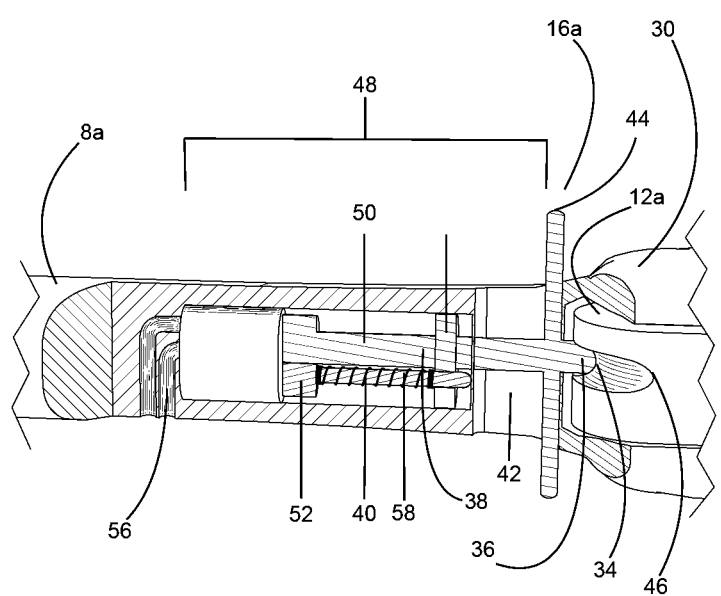
FIG. 10B is a magnified sectional view of the towing assembly of FIG. 9A exposing the interior of the shaft as the shaft is detachably and pivotally coupled to the slotted joint.

FIG. 10A-10B depict a sectional view of the interior of shaft 8*a* of member 4*a* with a clevis termination 30 as it is detachably and pivotally coupled to the slotted joint 12*a* (only partially shown). In FIG. 10A, the bolt 36 of the automated locking mechanism 16*a* is disengaged from the socket 34 of the slotted joint 12*a*. In FIG. 10B, the bolt 36 of the automated locking mechanism 16a is engaged with the socket 34 of the slotted joint 12a. At the junction between the clevis termination 30 and the shaft 8a is an aperture 42. A handle 44 projects perpendicularly out from the bolt 36 through the length of the aperture 42, and at least a portion of the handle 44 extends out of the aperture 42. The automated locking mechanism 16a is configured to automatically, and retractably, extend out of the clevis termination 34 of the shaft 8a, as described for FIGS. 1-8. More specifically, the automatic extension and retractable extension functions of bolt 36 are facilitated by a barrel 38, which holds and guides the bolt 36 as it extends or retracts, and a spring mechanism 40, which forces the bolt 36 to its fully extended position whenever the spring mechanism 40 is compressed during retraction of the bolt 36 into the barrel 38.

Furthermore, the automated locking mechanism 16a is also configured for direct and/or remote engagement/disengagement via an automation mechanism 48. For the particular embodiment of FIGS. 9A-11D, the automation mechanism 48 comprises a first component 50, a second component 52, a sliding block 54, and a hose/cord/cable bundle 54. The first component 50 and the second component 52 are held in the internal space defined by the shaft 8a. The sliding block 54, at least in part, helps maintain the relative alignment and orientation of the first component 50 and the second component 52. The sliding block 54 also allows portions of one component to displace relative to the other component without disturbing the original position of the other component (described in more detail herein).

In one embodiment, the internal space defined by the shaft 8a can be a hollow cavity in which the automation mechanism 48 sits. In another embodiment, the internal space defines a hollow cavity configured and structured to receive a housing (not depicted) holding the automation mechanism 48. A person having ordinary skill in the art understands that there are numerous other configurations and structures for the automation mechanism 48 that are suitable for the present invention.

Returning to FIGS. 10A-10B, the barrel 38 of the shaft 8a accesses the aperture 42 such that the bolt 36 may extend across the aperture 42 for reception into the socket 34 of the slotted joint 12a. The first component 50 of the automation mechanism 48 is configured to push/retract the bolt 36 across the aperture 42, that is, to slide the bolt 36 forwards without disturbing the relative position of the second component 52 of the automation mechanism 48, other than the spring mechanism 40 which would decompress.

The sliding block 54 of the automation mechanism 48 is configured to move laterally whenever the bolt 36 of the shaft 8a moves. For example, if the bolt 36 recedes into the barrel 38, then the sliding block 54 recedes with it compressing the spring mechanism 40 behind the sliding block 54. If the bolt 36, however, extends out of the barrel 38, then the sliding block 54 moves forward allowing the spring mechanism 40 to decompress.

Finally, the second component 52 of the automation mechanism 48 comprises an extension 58 holding the spring mechanism 40 behind the sliding block 54. The extension 58 traverses, via a mechanical restriction opening, the sliding block 54. The second component 52 is configured to push/retract the extension 58 through the sliding block 54. FIGS. 10A and 10B illustrate the extension 58 in its fully extended position. Because the sliding block 54 of the automation mechanism 48 allows the second component 52 to displace laterally relative to the first component 50 without disturbing the position of the first component 50, the second component 52 varies the compression of the spring mechanism 40 and, therefore, the spring force acting on the bolt 36. In one embodiment, the second component 52 leverages the spring mechanism 40, as would be understood by one having ordinary skill in the art, such that the second component 52 senses the amount of force acting on the bolt 36 as it articulates about the slotted joint 12a.

The first component 50 and/or the second component 52 of the automation mechanism 48 can be configured for hydraulic and/or electric automation controllable by a remote user. For example, the automation mechanism 48 may have known subcomponents configured for hydraulics, pneumatics, electromotives, Bowden cable mechanisms, mechanical motors/gears/pulleys, solenoids, etc. Of course, the bundle 56 may be of any type, variety or combination to provide the automation mechanism 48 with the necessary electrical, fluid, and/or mechanical power to operate the automation functions.

FIGS. 11A-D depict an embodiment of the articulation range available to the towing assembly 1 of FIG. 9A. More specifically, the shaft 8a detachably and pivotally coupled to the slotted joint 12a is shown transitioning from the position of FIGS. 11A and 11B through the position of FIG. 11C to the position of FIG. 11D. Moreover, FIGS. 11B-11D present a magnified cut-away view of the junction between the shaft 8a and the slotted joint 12a as the automated locking mechanism 16a transitions through the positions.

Figure 11A:
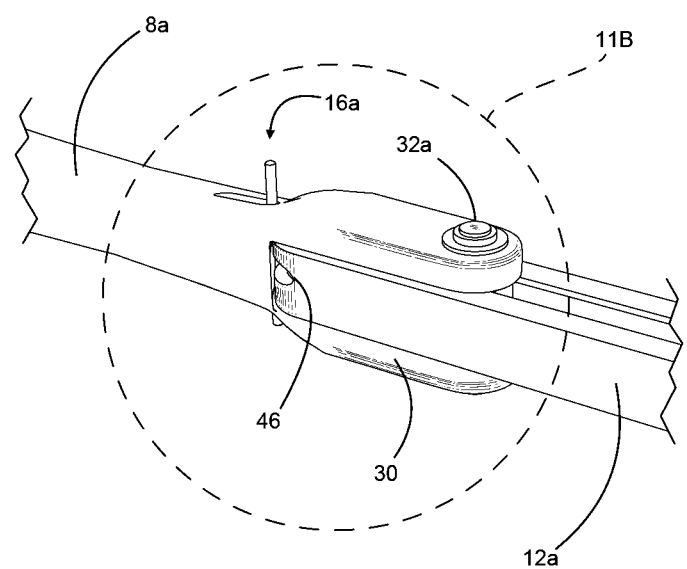
FIG. 11A is a magnified view of the towing assembly of FIG. 9A depicting the shaft detachably and pivotally coupled to the slotted joint and in the third position.
Figure 11B:
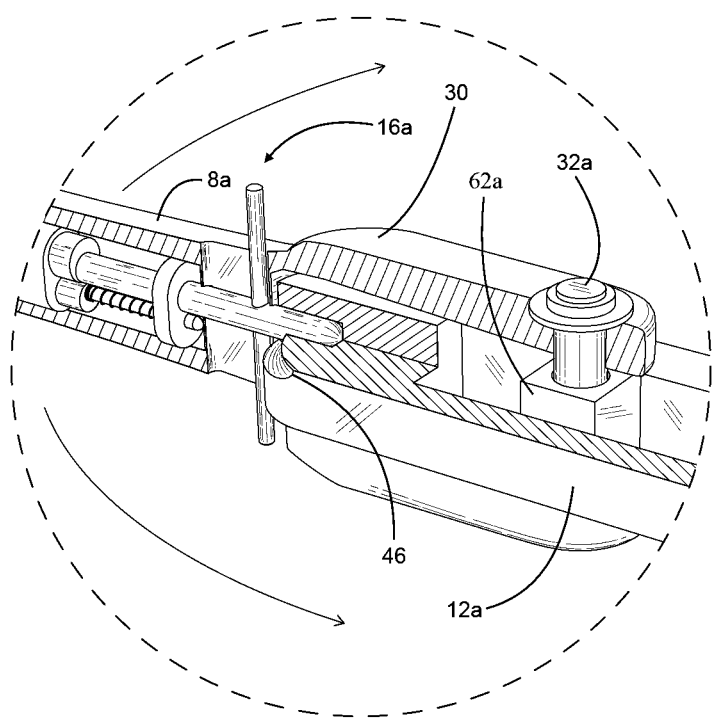
FIG. 11B is a magnified cut-away view of the towing assembly of FIG. 9A exposing the interior of the shaft as the shaft is detachably and pivotally coupled to the slotted joint and in the third position.
Figure 11C:
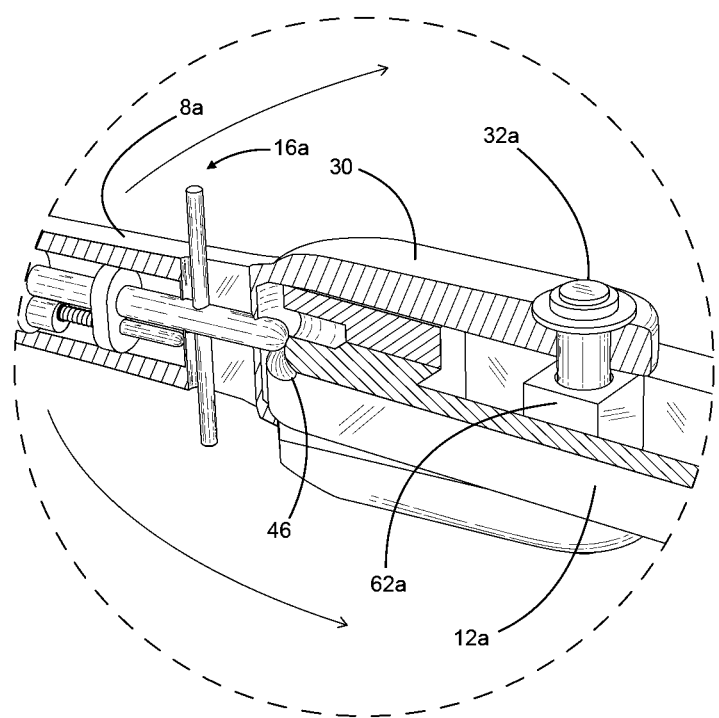
FIG. 11C is a magnified cut-away view of the towing assembly of FIG. 9A exposing the interior of the shaft as the shaft is detachably and pivotally coupled to the slotted joint and in the second position.
Figure 11D:
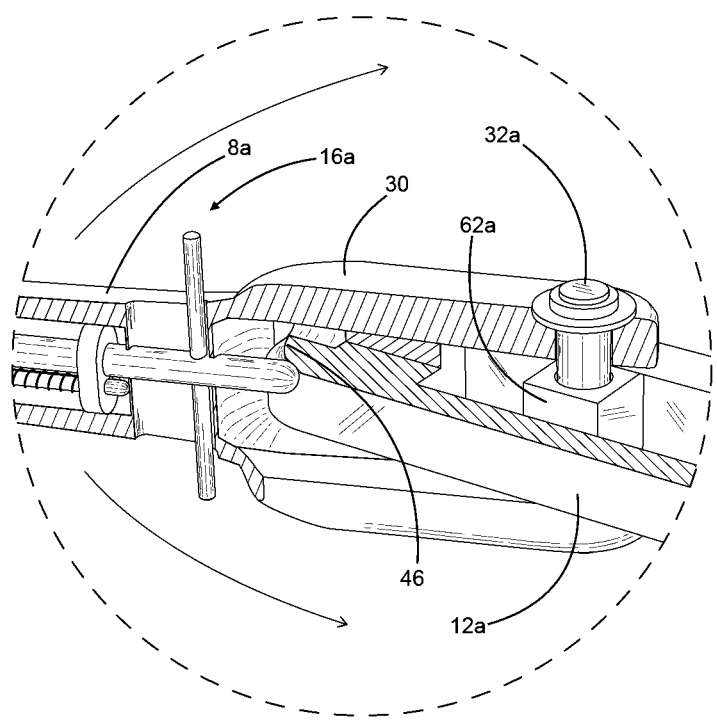
FIG. 11D is a magnified cut-away view of the towing assembly of FIG. 1A exposing the interior of the shaft as the shaft is detachably and pivotally coupled to the slotted joint and in the first position.

The position of FIGS. 11A and 11B is analogous to the third position of FIG. 8 but for the automated engagement and disengagement of the locking mechanism 16a. In the position of FIGS. 11A and 11B, the automated locking mechanism 16a is engaged with the socket 38 because the shaft 8a is appropriately aligned with the slotted joint 12a, and because the bolt 36 is extended out of the barrel 38, across the aperture 42, and into the socket 34 by the first component 50 of the automation mechanism 48. The extension 58 is extended by the second component 52 through sliding block 54. The sliding block 54 is positioned along the extension 58 such that the spring mechanism 40 is decompressed.

The position of FIG. 11C is analogous to the second position of FIG. 7 but for the automated engagement and disengagement of the locking mechanism 16a. In the position of FIG. 11C, the automated locking mechanism 16a is disengaged from the socket 38. The first component 50 of the automation mechanism 48 has retracted the bolt 36 backwards into the barrel 38 causing the sliding block 54 to slide backwards upon the extension 58 of the second component 2. The spring mechanism 40 is compressed. The shaft 8a is articulating upon the slotted joint 12a in a counterclockwise direction. The bolt 36 is being channeled by the guide groove 46 away from the socket 34.

The position of FIG. 11D is analogous to the first position of FIG. 6 but for the automated engagement and disengagement of the locking mechanism 16a. In the position of FIG. 11D, the automated locking mechanism 16a is still disengaged from the socket 38. The shaft 8a is still articulating upon the slotted joint 12a in a counterclockwise direction. The first component 50 of the automation mechanism 48 is no longer actively retracting or extending the bolt 36 into or out of the barrel 38. The passive state of the first component 50 allows the spring mechanism 40 to decompress by forcing the sliding block 54 forwards upon the extension 58 of the second component 2. Consequently, the sliding block 54 translates the force onto the first component 50 resulting in the bolt 36 being extended out of the barrel 38, across the aperture 42 and up along the guide groove 46.

Thus, by using the automatic locking mechanisms depicted in FIGS. 10 and 11 described in connection therewith along with the automatic operating mechanisms shown in either of FIGS. 9A-9B (telescoping) or FIGS. 12 and 13 (screw) and described therewith, or other extension mechanisms, an automatically articulating and de-articulating towing assembly 1 is described, which can be automatically locked in the articulated or other positions.

Figure 14:
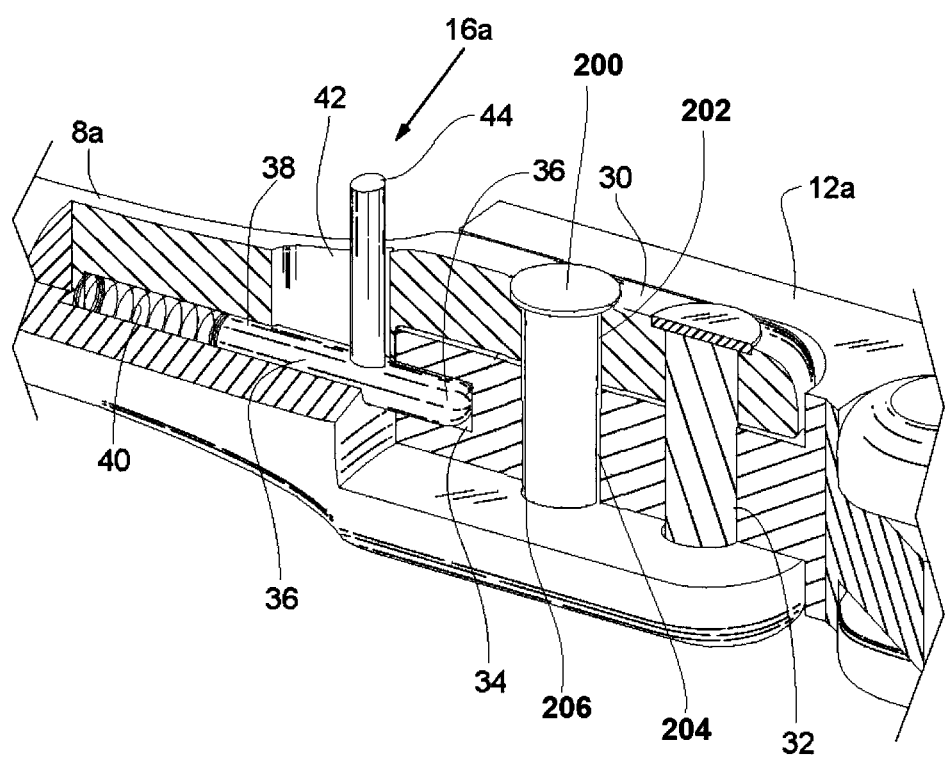
FIG. 14 is a magnified cut-away view of the towing assembly of FIG. 1A exposing the interior of the shaft as it is detachably and pivotally coupled to the elbow joint, and showing an additional or alternative manual locking pin.

FIG. 14 is a magnified cut-away view of the towing assembly 1 of FIG. 1A exposing the interior of the shaft 8a as it is detachably and pivotally coupled to the elbow joint 12a as shown in FIG. 5, and showing an additional or alternative manual locking pin 200. Locking pin 200 can be inserted through a first port 202 through the upper section of clevis termination 30 and a second port 204 into or through elbow joint 12a. When locking pin 200 is placed within ports 202, 204, clevis termination 30 and therefore shaft 8a will be locked in place relative to elbow joint 12a. A third port 206 can be located into or through the lower section of clevis termination 30, whereby locking pin 200 can extend through elbow joint 12a into third port 206 for additional strength and/or stability in locking shaft 8a relative to elbow joint 12a.

Each of the elbow joints 12 disclosed in this specification can be structured to have additional ports 202, 204, and/or 206 to accommodate an additional or alternate manual locking pin 200. In certain embodiments, each elbow joint 12 can have both an automatic locking mechanism 16 and a manual locking pin 200, while in other certain embodiments, not all elbow joints 12 can have both an automatic locking mechanism 16 and a manual locking pin 200. For example, elbow joint 12a can be structured to accommodate a manual locking pin 200 while elbow joint 12b can be structured not to accommodate a manual locking pin 200, and vice versa.

Figure 15:
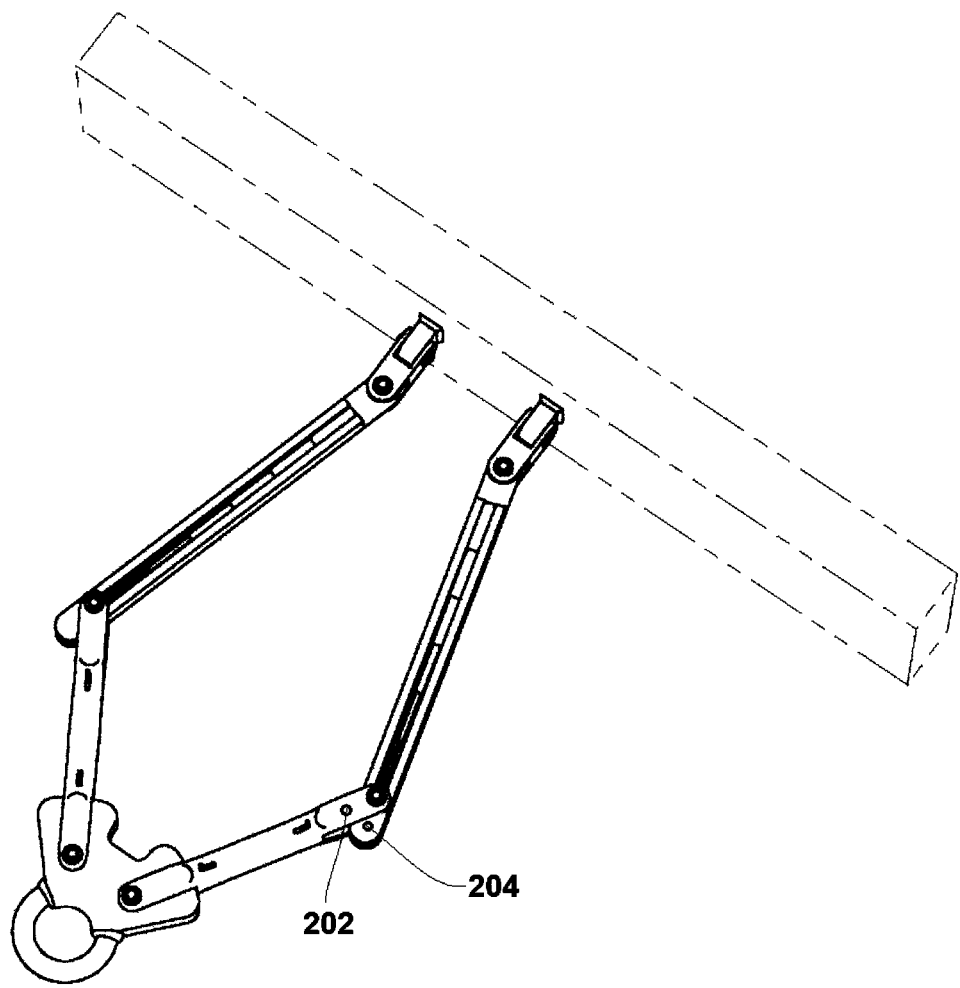
FIG. 15 is a perspective view of a second embodiment of the towing assembly of FIG. 9B in its first intermediate position, and showing the additional or alternative manual locking pin of FIG. 14.

FIG. 15 is a perspective view of a second embodiment of the towing assembly 1 of FIG. 9B in its first intermediate position, and showing the additional or alternative manual locking pin 200 of FIG. 14. This figure provides a view of the relative location of first port 202 and second port 204 when the towing assembly 1 is not in the aligned and locked position.

Although the particular embodiments shown and described above will prove to be useful in many applications in the towing art to which the present invention pertains, further modifications of the present invention will occur to persons skilled in the art. All such modifications are deemed to be within the scope and spirit of the present invention as defined by the appended claims.

What is claimed is:

1. A towing assembly, comprising:
a) a shaft detachably and pivotally coupled to a joint; and
b) an automatic locking mechanism configured to:
hold fixed a specific orientation and alignment of the shaft, relative to the joint, whenever the automatic locking mechanism is engaged; and
automatically engage whenever the specific orientation and alignment of the shaft and the joint, relative one another, is obtained,
wherein the joint comprises a socket and the automatic locking mechanism comprises a bolt, the socket configured to receive the bolt when the automatic locking mechanism is engaged.

2. The towing assembly of claim 1, wherein the automatic locking mechanism is at least partially situated at a junction between the shaft and the joint.

3. The towing assembly of claim 1, wherein the automatic locking mechanism is at least partially situated at a junction between the shaft and the joint, and at least partially embedded within the shaft.

4. The towing assembly of claim 1, wherein the automatic locking mechanism is at least partially situated at a junction between the shaft and the joint, at least partially embedded within the shaft, and at least partially received by the joint, when engaged.

5. The towing assembly of claim 1, wherein the automatic locking mechanism is additionally configured to receive an external force of sufficient magnitude to disengage the automatic locking mechanism.

6. A towing assembly comprising:
a) a shaft detachably and pivotally coupled to a joint; and
b) an automatic locking mechanism configured to:
hold fixed a specific orientation and alignment of the shaft, relative to the joint, whenever the automatic locking mechanism is engaged; and
automatically engage whenever the specific orientation and alignment of the shaft and the joint, relative one another, is obtained,
wherein the joint comprises a surface feature configured to:
minimize a resistance to articulation of the shaft as the shaft pivots towards the specific orientation and alignment, relative to the joint; and
facilitate the engagement of the automatic locking mechanism whenever the shaft obtains the specific orientation and alignment, relative to the joint.

7. The towing assembly of claim 6, wherein the surface feature of the joint is at least partially situated at the junction between the automatic locking mechanism and the joint.

8. A towing assembly, comprising:
a) a shaft detachably and pivotally coupled to a joint; and
b) an automatic locking mechanism situated, at least partially, at a junction between the shaft and the joint, and, at least partially, embedded within the shaft, the automatic locking mechanism configured to:
hold fixed a specific orientation and alignment of the shaft, relative to the joint, whenever the automatic locking mechanism is engaged; and
automatically engage whenever the specific orientation and alignment of the shaft and the joint, relative one another, is obtained;
wherein the joint comprises a socket and the automatic locking mechanism comprises a bolt, the socket configured to receive the bolt when the automatic locking mechanism is engaged, and
wherein, when engaged, the automatic locking mechanism is at least partially received by the joint.

9. The towing assembly of claim 8, wherein the joint comprises a surface feature at least partially situated at the junction between the automatic locking mechanism and the joint, the surface feature configured to:
minimize a resistance to articulation of the shaft as the shaft pivots towards the specific orientation and alignment, relative to the joint; and
facilitate an engagement of the automatic locking mechanism whenever the shaft obtains the specific orientation and alignment, relative to the joint.

10. The towing assembly of claim 8, wherein the automatic locking mechanism comprises an externally accessible portion configured to receive an external force of sufficient magnitude to disengage the automatic locking mechanism.

11. The towing assembly of claim 10, wherein the externally accessible portion of the automatic locking mechanism is further configured to mechanically translate the external force whereby the bolt is retracted out of the socket.

12. The towing assembly of claim 11, wherein the shaft defines an aperture through which the externally accessible portion of the automatic locking mechanism extends.

13. A towing assembly, comprising:
a) a shaft detachably and pivotally coupled to a joint comprising a socket and a guide groove, the guide groove configured to channel towards and away from the socket; and
b) an automatic locking mechanism comprising a retractable bolt projecting out towards the joint, the retractable bolt configured to engage with the guide groove as the shaft pivots towards the socket, the automatic locking mechanism configured to:
  hold fixed a specific orientation and alignment of the shaft, relative to the joint, whenever the automatic locking mechanism is engaged; and
  automatically engage whenever the specific orientation and alignment of the shaft and the joint, relative one another, is obtained;
wherein, when the retractable bolt engages with the groove guide, the retractable bolt retracts into the shaft and away from the joint; and
wherein, when engaged, the bolt of the automatic locking mechanism is at least partially received by the socket.

14. The towing assembly of claim 13, wherein the guide groove defines an elongated concave recess and the retractable bolt defines a rounded tip complementary of the elongated concave recess.

15. The towing assembly of claim 13, wherein the automatic locking mechanism additionally comprises an externally accessible portion configured to receive an external force, and mechanically translate the external force, such that bolt retracts into the shaft and away from the joint.

16. The towing assembly of claim 15, wherein the shaft defines an aperture through which the externally accessible portion of the automatic locking mechanism extends.

17. The towing assembly of claim 16, wherein the automatic locking mechanism additionally comprises a barrel configured to hold and guide the bolt as it extends and retracts.

18. The towing assembly of claim 13, wherein the shaft is detachably and pivotally coupled to the joint via a clevis termination.

19. The towing assembly of claim 18, wherein the joint is an elbow joint.

* * * * *